United States Patent
Takeuchi et al.

(10) Patent No.: US 8,926,315 B2
(45) Date of Patent: Jan. 6, 2015

(54) INJECTION MOLDING MACHINE

(71) Applicant: Sumitomo Heavy Industries, Ltd., Tokyo (JP)

(72) Inventors: Shigeru Takeuchi, Chiba (JP); Masahiro Hayakawa, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/826,811

(22) Filed: Mar. 14, 2013

(65) Prior Publication Data
US 2013/0251842 A1 Sep. 26, 2013

(30) Foreign Application Priority Data
Mar. 21, 2012 (JP) .................................. 2012-064513

(51) Int. Cl.
*B29C 45/40* (2006.01)
*B29C 45/42* (2006.01)
*B29C 45/76* (2006.01)

(52) U.S. Cl.
CPC ............. *B29C 45/4208* (2013.01); *B29C 45/40* (2013.01); *B29C 45/4005* (2013.01); *B29C 45/7626* (2013.01); *B29C 2045/4094* (2013.01); *B29C 2045/4036* (2013.01)
USPC .......................................... 425/556; 425/438

(58) Field of Classification Search
CPC .. B29C 45/40; B29C 45/4005; B29C 45/401; B29C 45/4094; B29C 45/7626; B29C 45/4208
USPC ...................... 425/556, 436 R, 438
See application file for complete search history.

(56) References Cited

U.S. PATENT DOCUMENTS

| | | | | |
|---|---|---|---|---|
| 5,052,910 A | * | 10/1991 | Hehl | 425/150 |
| 5,256,364 A | * | 10/1993 | Herbst | 264/334 |
| 5,340,528 A | * | 8/1994 | Machida et al. | 264/328.7 |
| 5,648,103 A | * | 7/1997 | Takanohashi | 425/107 |
| 6,527,540 B1 | * | 3/2003 | Dantlgraber | 425/589 |
| 7,086,851 B2 | * | 8/2006 | Ickinger et al. | 425/556 |
| 7,124,581 B2 | * | 10/2006 | Dantlgraber | 60/560 |
| 7,399,436 B2 | | 7/2008 | Tsuji et al. | |
| 8,002,532 B2 | * | 8/2011 | Stirn et al. | 425/139 |
| 8,444,409 B2 | * | 5/2013 | Eppich | 425/444 |
| 2003/0096034 A1 | * | 5/2003 | Becker et al. | 425/444 |
| 2007/0269552 A1 | | 11/2007 | Dantlgraber | |
| 2008/0050464 A1 | * | 2/2008 | Dantlgraber | 425/556 |
| 2008/0233227 A1 | | 9/2008 | Onishi et al. | |
| 2011/0038976 A1 | * | 2/2011 | Stirn et al. | 425/161 |
| 2011/0064843 A1 | * | 3/2011 | Eppich | 425/556 |
| 2011/0256259 A1 | * | 10/2011 | Chen | 425/556 |
| 2013/0251842 A1 | * | 9/2013 | Takeuchi et al. | 425/556 |

FOREIGN PATENT DOCUMENTS

| | | |
|---|---|---|
| DE | 103 54 955 A1 | 6/2005 |
| DE | 10 2004 033 121 A1 | 2/2006 |
| EP | 1 136 224 A2 | 9/2001 |
| EP | 1 813 413 A1 | 8/2007 |
| EP | 2 281 675 A2 | 2/2011 |
| JP | 4790358 | 10/2011 |
| WO | WO 2005/068155 | 7/2005 |

OTHER PUBLICATIONS

Extended European Search Report dated Jul. 30, 2013.

* cited by examiner

*Primary Examiner* — Yogendra Gupta
*Assistant Examiner* — Emmanuel S Luk
(74) *Attorney, Agent, or Firm* — IPUSA, PLLC

(57) ABSTRACT

An injection molding machine includes an electric ejector configured to eject a molding product from a mold, and an assist actuator configured to assist ejection of the molding product by the electric ejector.

5 Claims, 5 Drawing Sheets

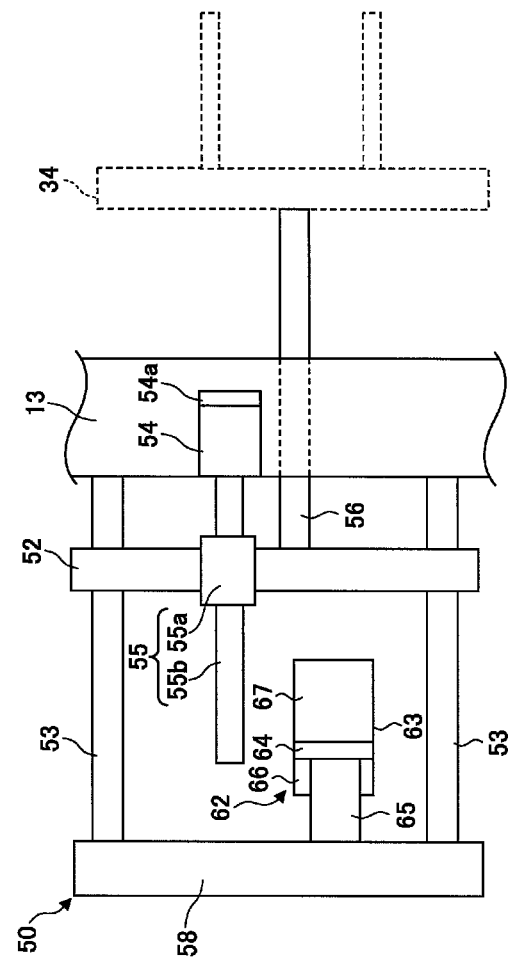

INJECTION MOLDING MACHINE

CROSS-REFERENCE TO RELATED APPLICATION

This application is based upon and claims the benefit of priority of Japanese Patent Application No. 2012-064513, filed on Mar. 21, 2012, the entire contents of which are incorporated herein by reference.

BACKGROUND OF THE INVENTION

1. Field of the Invention

The present invention relates to an injection molding machine.

2. Description of the Related Art

Injection molding machines manufacture molding products by filling the cavity space of a molding apparatus with molten resin and solidifying the molten resin. The molding apparatus includes a stationary mold and a movable mold. A cavity space is formed between the stationary mold and the movable mold at the time of mold clamping. A molding product molded in the cavity space is ejected from the movable mold after mold opening. An electric ejector is used for this ejection (for example, see International Publication Pamphlet No. WO 2005/068155). The molding product ejected from the movable mold is extracted from the injection molding machine with a molding product extractor.

SUMMARY OF THE INVENTION

According to an aspect of the present invention an injection molding machine includes an electric ejector configured to eject a molding product from a mold and an assist actuator configured to assist ejection of the molding product by the electric ejector.

It is to be understood that both the foregoing general description and the following detailed description are exemplary and explanatory and not restrictive of the invention.

BRIEF DESCRIPTION OF THE DRAWINGS

FIGS. 3A through 3C are diagrams illustrating operations of the ejector and the assist mechanism of FIG. 2.

DETAILED DESCRIPTION OF THE PREFERRED EMBODIMENTS

Figure 1:
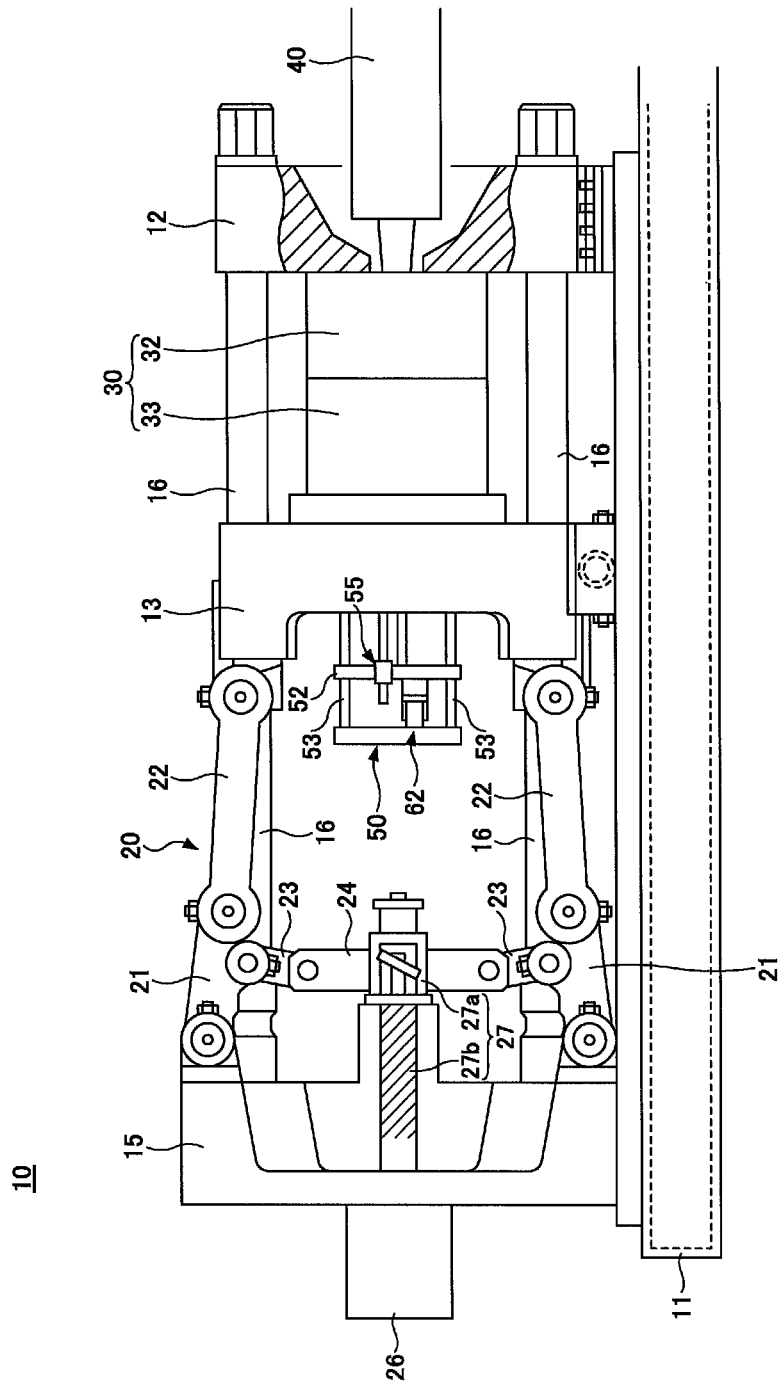
FIG. 1 is a diagram illustrating an outline of an injection molding machine according to an embodiment of the present invention.

As described above, in injection molding machines, a molding product molded in the cavity space is ejected from the movable mold after mold opening. When the molding product is ejected from the mold, a great force is required to release the molding product from the mold because the molding product is attached to the mold. After the molding product is released from the mold, no great force is required but a quick delivery of the molding product to a molding product extraction position is required to shorten the molding cycle.

According to an aspect of the present invention, an injection molding machine is provided that produces a force necessary to release a molding product when the molding product is ejected from a mold and also quickly delivers the molding product to a molding product extraction position after the molding product is released from the mold.

A description is given below, with reference to the accompanying drawings, of one or more embodiments of the present invention. In the drawings, the same or corresponding elements or configurations are referred to by the same or corresponding reference numerals, and redundant descriptions have been omitted. Further, in the following description, the direction in which a movable platen moves at the time of mold closing is referred to as the "forward direction" and the direction in which the movable platen moves at the time of mold opening is referred to as the "backward direction."

FIG. 1 is a schematic diagram illustrating an outline of an injection molding machine 10 according to an embodiment of the present invention. FIG. 1 illustrates a clamped mold state.

The injection molding machine 10 illustrated in FIG. 1 is of a horizontal type with a horizontal mold clamping direction. The injection molding machine 10 includes a frame 11, a stationary platen 12 fixed to the frame 11, and a toggle support 15 provided at a predetermined distance from the stationary platen 12 to be movable relative to the frame 11. Multiple (for example, four) tie bars 16 are provided between the stationary platen 12 and the toggle support 15.

The injection molding machine 10 further includes a movable platen 13 provided such as to face the stationary platen and be movable along the tie bars 16 (movable in the rightward and the leftward direction in FIG. 1). A movable mold 33 is attached to the movable platen 13, and a stationary mold 32 is attached to the stationary platen 12. The stationary mold 32 and the movable mold 33 form a molding apparatus 30.

The injection molding machine 10 further includes a toggle mechanism 20 provided between the movable platen 13 and the toggle support 15, a mold clamping motor 26 that causes the toggle mechanism 20 to operate, and a ball screw mechanism 27 as a transmission mechanism that converts rotational motion generated by the mold clamping motor 26 into linear motion and transmits the linear motion to the toggle mechanism 20. The stationary platen 12, the movable platen 13, the toggle support 15, the toggle mechanism 20, and the mold clamping motor 26 may form a mold clamping device.

The toggle mechanism 20 includes a crosshead 24, first toggle levers 21, second toggle levers 23, and toggle arms 22. The crosshead 24 is movable back and forth in directions parallel to a mold opening direction (to open the molding apparatus 30) and a mold closing direction (to close the molding apparatus 30). The first toggle levers 21 are pivotably attached to the toggle support 15. The second toggle levers 23 are pivotably attached to the crosshead 24. The toggle arms 23 are pivotably attached to the movable platen 13. The first toggle levers 21 and the second toggle levers 23 are linked, and the first toggle levers 21 and the toggle arms 22 are linked. The toggle mechanism 20 is a so-called involute five-joint double toggle mechanism, and is symmetric with respect to its horizontal axis.

The ball screw mechanism 27 includes, for example, a ball screw nut 27a fixed to the crosshead 24, and a ball screw shaft 27b screwed to the ball screw nut 27a. The ball screw shaft 27b is rotatably supported relative to the toggle support 15. The rotation of the output shaft of the mold clamping motor 26 causes the ball screw shaft 27b to rotate to cause the ball screw nut 2a to move forward or backward, so that the crosshead 24 moves forward or backward.

Next, a description is given of an operation of the injection molding machine 10 of the above-described configuration.

When the toggle mechanism 20 is caused to operate by causing the crosshead 24 as a driven member to move forward by driving the mold clamping motor 26 in a forward direction, the movable platen 13 is caused to move forward so that mold closing is performed.

When the mold clamping motor 26 is driven further in the forward direction, the toggle mechanism 20 generates a clamping force determined by multiplying the thrust caused by the mold clamping motor 26 by a toggle multiplying factor. Mold clamping is performed with this clamping force, so that a cavity space (not graphically illustrated) is formed between the stationary mold 32 and the movable mold 33 in a clamped mold state. The cavity space is filled with molten resin injected from an injection apparatus 40, and the injected molten resin is solidified into a molding product.

Next, when the toggle mechanism 20 is caused to operate by causing the crosshead 24 to move backward by driving the mold clamping motor 26 in a reverse direction, the movable platen 13 is caused to move backward, so that mold opening is performed. Thereafter, by causing an electric ejector to operate, the molding product is ejected from the movable mold 33.

The mold clamping device of this embodiment generates a clamping force using the toggle mechanism 20. Alternatively, however, the thrust generated by the mold clamping motor 26 may be directly transmitted to the movable platen 13 as a mold clamping force without using the toggle mechanism 20. Further, a thrust generated by a mold clamping cylinder may also be directly transmitted to the movable platen 13 as a mold clamping force. Furthermore, mold opening and closing may be performed by a linear motor, and mold clamping may be performed using an electromagnet. The form of the mold clamping device is not limited.

Figure 2:
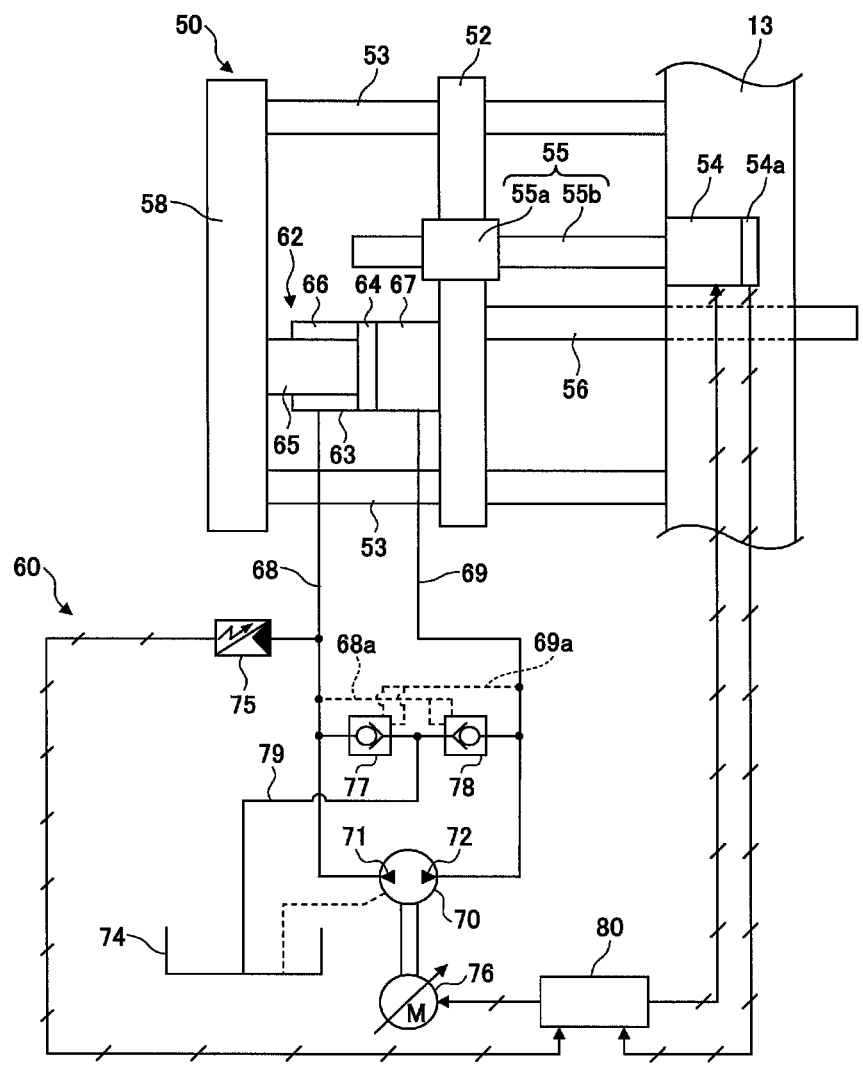
FIG. 2 is a diagram illustrating an ejector and an assist mechanism according to an embodiment of the present invention.
Figure 3A:
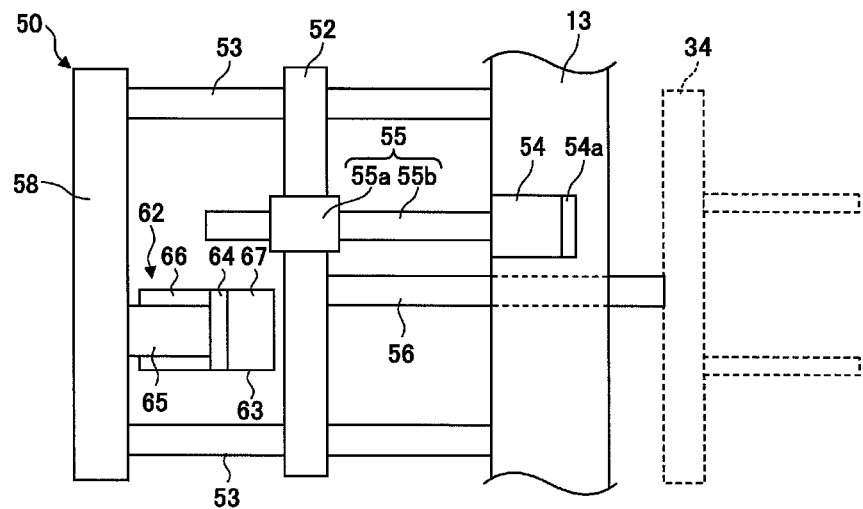
Figure 3B:
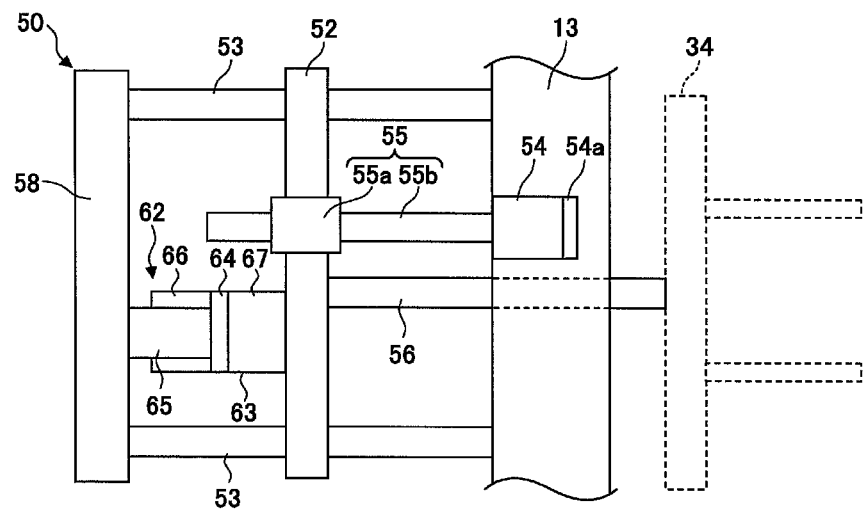

FIG. 2 is a diagram illustrating an electric ejector and an assist mechanism according to an embodiment of the present invention. FIGS. 3A, 3B and 3C are diagrams illustrating operations of the electric ejector and the assist motor according to the embodiment of FIG. 2.

The injection molding machine 20 includes an electric ejector 50 that is used to eject a molding product from the movable mold 33. The electric ejector 50 is attached to the movable platen 13 as illustrated in FIG. 2.

The electric ejector 50 includes a slidable base 52 that is movable in directions to come into and out of contact with the movable platen 13. The slidable base 52 is movable in directions parallel to the mold opening direction and the mold closing direction (the rightward and the leftward direction in FIG. 2 and FIGS. 3A through 3C) along guide rods 53 projecting backward from the movable platen 13.

The electric ejector 50 further includes an ejector motor 54 that is an electric motor and a ball screw mechanism 55 as a transmission mechanism that converts rotational motion generated by the ejector motor 54 into linear motion and transmits the linear motion to the slidable base 52.

The ball screw mechanism 55 includes, for example, a ball screw nut 55a fixed to the slidable base 52, and a ball screw shaft 55b screwed to the ball screw nut 55a. The ball screw shaft 55b is directly connected concentrically with the output shaft of the ejector motor 54. The rotation of the output shaft of the ejector motor 54 causes the ball screw shaft 55b to rotate to cause the ball screw nut 55a to move forward or backward, so that the slidable base 52 moves forward or backward.

According to this embodiment, the output shaft of the ejector motor 54 and the ball screw shaft 55b are directly connected concentrically. Alternatively, however, the output shaft of the ejector motor 54 and the ball screw shaft 55b may also be connected via a speed reduction mechanism composed of multiple gears or via a timing belt.

The ejector motor 54 may be a servomotor, and may include an encoder part 54a that detects the speed of rotation (for example, rpm) of the ejector motor 54. The ejector motor 54 is subjected to feedback control based on the detection result of the encoder part 54a. The ejector motor 54 may be attached to the movable platen 13 as illustrated in FIG. 2, or may be attached to an attachment plate 58 to be described below.

The electric ejector 50 further includes an ejector rod 56 that moves together with the slidable base 52. The ejector rod 56 is fixed to the slidable base 52, and is movably inserted into a through hole formed in the movable platen 13. The end of the ejector rod 56 may be connected to a molding product ejecting member 34 provided in the movable mold 33 (see FIG. 1).

In this electric ejector 50, when the ejector motor 54 is driven in a forward (rotational) direction, the slidable base 52 and the ejector rod 56 are caused to move forward. In conjunction with the forward movement of the ejector rod 56, the molding product ejecting member 34 (see FIG. 3) projects forward from the movable mold 33 to eject a molding product from the movable mold 33. Thereafter, the ejector rod 56 further moves forward to deliver the molding product to a molding product extraction position.

When the ejector motor 54 is driven in a reverse direction after extraction of the molding product from the injection molding machine 10, the slidable base 52 and the ejector rod 56 are caused to move backward. In conjunction with the backward movement of the ejector rod 56, the molding product ejecting member 34 returns to its original position.

The injection molding machine 10 includes an assist mechanism 60 that assists the operation of ejecting a molding product by the electric ejector 50.

The assist mechanism 60 includes a hydraulic cylinder (for example, an oil hydraulic cylinder) 62 as a hydraulic actuator, and a bidirectionally rotatable hydraulic pump (for example, an oil hydraulic pump) 70 as a hydraulic source that generates fluid pressure. The hydraulic pump 70 is driven by a pump motor 76 that is a servomotor. The rotation speed and the rotation direction of the pump motor 76 are controlled by a controller 80.

The hydraulic cylinder 62 includes, for example, a cylinder body 63, a piston 64 that is reciprocatable inside the cylinder body 63, and a cylinder rod 65 that is connected to the piston 64 to retractably project backward from the cylinder body 63. The end of the cylinder rod 65 is fixed to the attachment plate 58, and the attachment plate 58 is fixed to the movable platen 13 via the guide rods 53. The hydraulic cylinder 62 is provided between the attachment plate 58 and the slidable base 52.

The hydraulic cylinder 62 includes a rear chamber 66 as a first chamber and a front chamber 67 as a second chamber, which are separated by the piston 64 inside the hydraulic cylinder 62. Because the cylinder rod 65 passes through the rear chamber 66, the rear chamber 66 has a smaller cross-sectional area than the front chamber 67.

The hydraulic pump 70 includes a first suction and discharge port 71 and a second suction and discharge port 72. The first suction and discharge port 71 is connected to the rear chamber 66 of the hydraulic cylinder 62 via a first passage 68. The second suction and discharge port 72 is connected to the front chamber 67 of the hydraulic cylinder 62 via a second passage 69.

The hydraulic pump 70 is configured to generate fluid pressure by drawing in hydraulic fluid from one of the first suction and discharge port 71 and the second suction and discharge port 72 and discharging the hydraulic fluid from the other of the first suction and discharge port 71 and the second suction and discharge port 72 by switching the rotation direction of the pump motor 76. The hydraulic pump 70 is also configured to draw in hydraulic fluid from a tank 74, which stores hydraulic fluid, and discharge the hydraulic fluid from one of the first suction and discharge port 71 and the second suction and discharge port 72.

When hydraulic fluid to which pressure is applied by the hydraulic pump 70 is discharged from the first suction and discharge port 71 to be supplied to the rear chamber 66 of the hydraulic cylinder 62 via the first passage 68, the cylinder body 63 moves forward. When hydraulic fluid to which pressure is applied by the hydraulic pump 70 is discharged from the second suction and discharge port 72 to be supplied to the front chamber 67 of the hydraulic cylinder 62 via the second passage 69, the cylinder body 63 moves backward.

A pressure sensor 75 that detects the fluid pressure of the hydraulic fluid is provided in a middle portion of the first passage 68 connected to the rear chamber 66 of the hydraulic cylinder 62. The pressure sensor 75 transmits a detection signal to the controller 80. The fluid pressure detected by the pressure sensor 75 is substantially equal to the fluid pressure inside the rear chamber 66 of the hydraulic cylinder 62.

When the controller 80 causes the pump motor 76 to rotate in a forward (rotational) direction, the hydraulic pump 70 rotates in a forward (rotational) direction, so that hydraulic fluid is discharged from the first suction and discharge port 71 to be supplied to the rear chamber 66 of the hydraulic cylinder 62. As a result, the rear chamber 66 expands and the front chamber 67 contracts, so that the cylinder body 63 moves forward to come into contact with the slidable base 52. The hydraulic fluid continues to be supplied to the rear chamber 66 of the hydraulic cylinder 62, so that the fluid pressure inside the rear chamber 66 increases to increase a force to press the slidable base 52 forward.

When the controller 80 causes the pump motor 76 to rotate in a reverse direction, the hydraulic pump 70 rotates in a reverse direction, so that hydraulic fluid is discharged from the second suction and discharge port 72 to be supplied to the front chamber 67 of the hydraulic cylinder 62. As a result, the front chamber 67 expands and the rear chamber 66 contracts, so that the cylinder body 63 moves backward, and the injection apparatus 40 moves back. The cylinder body 63 moves backward out of contact with and away from the slidable base 52.

According to this embodiment, check valves 77 and 78 are provided between the first passage 68 and the second passage 69. A portion between the two check valves 77 and 78 is connected to the tank 74 by a drain passage 79. The check valves 77 and 78 and the drain passage 79 form a drain circuit for controlling excess or shortage in the amount of circulation of hydraulic fluid due to a difference between the volumes of the rear chamber 66 and the front chamber 67 of the hydraulic cylinder 62.

For example, when the cylinder body 63 is caused to move forward, hydraulic fluid is supplied from the first passage 68 to the rear chamber 66, and hydraulic fluid is discharged from the front chamber 67. According to this embodiment, the cross-sectional area of the front chamber 67 is larger than the cross-sectional area of the rear chamber 66. Therefore, the amount of hydraulic fluid discharged from the front chamber 67 is larger than the amount of hydraulic fluid supplied to the rear chamber 66. When hydraulic fluid continues to be supplied from the hydraulic pump 70 to the first passage 68 in order to cause the cylinder body 63 to move forward, the fluid power of the hydraulic fluid inside the first passage 68 increases, so that the hydraulic fluid inside the first passage 68 works to open the check valve 78 of the second passage 69 through a branch passage 68a of the first passage 68. When the check valve 78 is opened, hydraulic fluid discharged from the front chamber 67 returns to the tank 74 through the check valve 78 and the drain passage 79. Thus it is possible to control excess or shortage of hydraulic fluid in the first passage 68 and the second passage 69. The check valve 77 is opened when the fluid pressure of hydraulic fluid inside a branch passage 69a of the second passage 69 increases.

According to the above-described assist mechanism 60, high-pressure hydraulic fluid of the rear chamber 66 or the front chamber 67 of the hydraulic cylinder 62 is drawn in into the hydraulic pump 70 and then is discharged by the hydraulic pump 70. At this point, only excess hydraulic fluid is returned to the tank 74.

According to the above-described assist mechanism 60, the cross-sectional area of the front chamber 67 is larger than the cross-sectional area of the rear chamber 66. Therefore, when the cylinder body 63 is caused to move backward, the amount of hydraulic fluid discharged from the rear chamber 66 is smaller than the amount of hydraulic fluid supplied to the front chamber 67. Therefore, the hydraulic fluid discharged from the rear chamber 66 may be supplied to the front chamber 67 of the hydraulic cylinder 62 via the fluid pump 70 without depressurization (being returned to the tank 74). Accordingly, at the time of starting the backward movement of the cylinder body 63, there is no need to wait for hydraulic fluid to return from the rear chamber 66 to the tank 74, so that it is possible to start the backward movement of the cylinder body 63 immediately after its forward movement, thus making it possible to shorten the molding cycle. There is a wait time between the completion of the backward movement and the start of the forward movement of the cylinder body 63 because mold closing, mold clamping, and mold opening are performed between the completion of the backward movement and the start of the forward movement of the cylinder body 63.

Further, according to the above-described assist mechanism 60, the hydraulic fluid of the rear chamber 66 and the front chamber 67 of the hydraulic cylinder 62 is circulated via the hydraulic pump 70. Therefore, the suction pressure of the hydraulic pump 70 is a fluid pressure at the hydraulic cylinder 62, which is higher than atmospheric pressure. Therefore, the compression ratio is reduced, so that it is possible to cause the hydraulic pump 70 to operate efficiently. Further, there is no need to re-pressurize hydraulic fluid after returning its fluid pressure to atmospheric pressure (that is, after returning the hydraulic fluid to the tank 74), so that it is possible to prevent hydraulic fluid from generating heat. Accordingly, it is possible to suppress hydraulic fluid degradation.

Next, a description is given, with reference to FIGS. 3A through 3C, of a method of ejecting a molding product using the electric ejector 50 and the assist mechanism 60 of the above-described embodiment. The electric ejector 50 and the assist mechanism 60 are caused to operate under the control of the controller 80.

After mold opening, the controller 80 causes the ejector motor 54 to rotate in a forward (rotational) direction to cause the ejector rod 56 to move forward in order to eject a molding product from the movable mold 33. At this point, the controller 80 performs feedback control on the electric current value of electric current supplied to the ejector motor 54 based on the detection result of the encoder part 54a, so that the rotation speed of the ejector motor 54 reaches a target value. An upper limit value is set for the electric current value of electric current supplied to the ejector motor 54 in order to prevent overheating of the ejector motor 54. That is, an upper limit value is set for the rotary torque of the ejector motor 54. Depending on the material quality or the shape of the molding apparatus 30 or the material quality of resin, a large force may be necessary for the mold release of a molding product, so that even when the electric current value of electric current supplied to the ejector motor 54 reaches an upper limit value, the ejector motor 54 may not rotate in a forward (rotational) direction, thus preventing the ejector rod 56 from moving forward as illustrated in FIG. 3A.

Therefore, the controller 80 puts the assist mechanism 60 into operation in order to assist the ejecting operation of the electric ejector 50. For example, the operation of the assist mechanism 60 may be started when the encoder part 54a detects the ejector motor 54 not rotating in a forward (rotational) direction when the electric current value of electric current supplied to the ejection motor 54 reaches an upper limit value. In this case, it is possible to reduce electric power consumption. Alternatively, the operation of the assist mechanism 60 may be started when the supply of electric current to the ejector motor 54 is started. In this case, it is possible to shorten the molding cycle. Whether rotation of the ejector motor 54 is deemed to be present or absent may be determined according to whether its rotational speed (measured in rpm, for example) is higher than a threshold value.

The controller 80 causes the pump motor 76 to rotate in a forward (rotation) direction in the state illustrated in FIG. 3A to cause the cylinder body 63 to move forward, so as to cause the cylinder body 63 to come into contact with the slidable base 52 as illustrated in FIG. 3B. When hydraulic fluid continues to be supplied to the rear chamber 66 of the hydraulic cylinder 62 in this state, the fluid pressure inside the rear chamber 66 increases to increase a force to press the slidable base 52 forward. When this force sufficiently increases, a molding product is released from the movable mold 33 to allow the ejector rod 56 to move forward.

After the molding product is released from the movable mold 33, because a large force is not necessary the molding product is quickly delivered to a molding product extraction position by the electric ejector 50, whose thrust is lower and whose speed is higher than the assist mechanism 60, as illustrated in FIG. 3C.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, although the injection molding machine 10 is described in the embodiments above as a horizontal type with a horizontal mold clamping direction, the injection molding machine 10 may also be a vertical type with a vertical mold clamping direction. In this case, the electric ejector 50 may be attached to the stationary platen 12.

Further, while the electric ejector 50 includes a rotary motor as a drive source according to the above-described embodiments, the electric ejector 50 may alternatively include a linear motor. In this case, the thrust of the linear motor may be directly input to the slidable base 52 without using the ball screw mechanism 55.

Further, while the ejector rod 56 is fixed to the slidable base 52 according to the above-described embodiments, alternatively, the ejector rod 56 may be fixed to an intermediate plate (not graphically illustrated), and the intermediate plate may be fixed to the slidable base 52 via a connecting rod. The slidable base 52 and the ejector rod 56 may be configured as desired as long as the slidable base 52 and the ejector rod 56 are caused to move together.

Further, while the ejector rod 56 and the molding product ejecting member 34 are connected according to the above-described embodiments, alternatively, the ejector rod 56 and the molding product ejecting member 34 may not be connected, and there may be a slight time difference between the start of the forward movement of the ejector rod 56 and the start of ejecting of the molding product ejecting member 34. The molding product ejecting member 34 may be caused to move forward by a further forward movement of the ejector rod 56 after the ejector rod 56 moves forward to come into contact with the molding product ejecting member 34. In this case, the molding product ejecting member 34 is caused to move backward by the urging force of a return spring.

Further, while the assist actuator is described in the embodiments above as a hydraulic actuator (the hydraulic cylinder 62), the assist actuator may alternatively be an electric actuator. Because the spilling of liquid does not occur with an electric actuator it is easy to handle.

Figure 4:
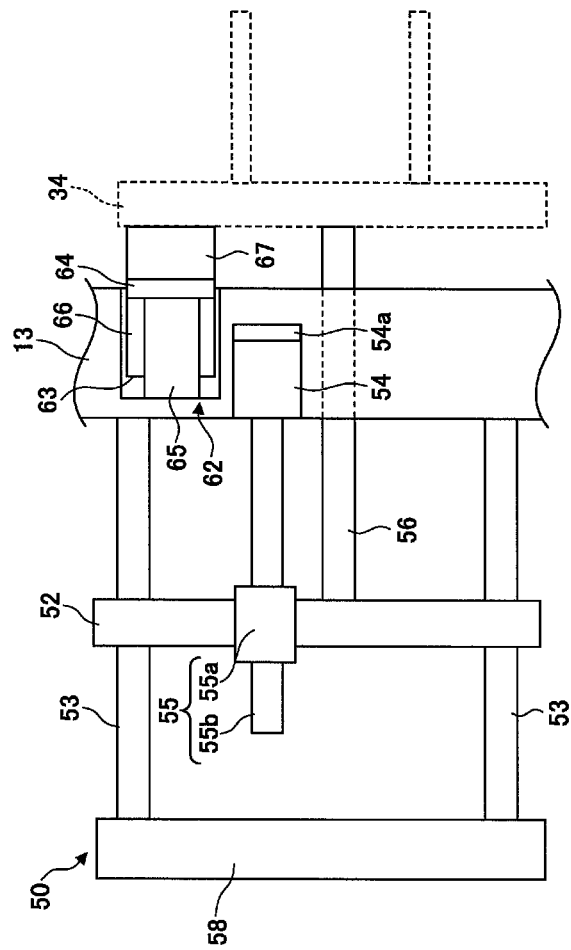
FIG. 4 is a diagram illustrating the ejector and the assist mechanism according to a variation.

Further, while the hydraulic cylinder 62 presses the slidable base 52 from its rear (back) side to assist the forward movement of the ejector rod 56 according to the above-described embodiments, the hydraulic cylinder 62 may alternatively press the molding product ejecting member 34 from its rear (back) side as illustrated in FIG. 4.

Further, while the hydraulic circuit circulates hydraulic fluid via the hydraulic pump 70 between the rear chamber 66 and the front chamber 67 of the hydraulic cylinder 62 according to the above-described embodiments, the hydraulic circuit may alternatively return hydraulic fluid from the rear chamber 66 or the front chamber 67 to the tank 74 and then cause the hydraulic pump 70 to draw in and discharge the hydraulic fluid.

What is claimed is:

1. An injection molding machine, comprising:
    an electric ejector configured to eject a molding product from a mold, the electric ejector including
        a slidable base configured to move in directions to come into and out of contact with a platen supporting the mold;
        an electric motor configured to cause the slidable base to move;
        a transmission mechanism configured to convert rotational motion generated by the electric motor into linear motion and transmit the linear motion to the slidable base; and
        an ejector rod configured to move together with the slidable base; and
    an assist actuator configured to assist ejection of the molding product by the electric ejector,
    wherein the assist actuator is configured to assist a movement of the ejector rod in a direction to eject the molding product.

2. The injection molding machine as claimed in claim 1, wherein the assist actuator is a hydraulic actuator.

3. The injection molding machine as claimed in claim 2, further comprising:
    a bidirectionally rotatable hydraulic source configured to drive the hydraulic actuator and control an output fluid pressure;

a servomotor configured to drive the hydraulic source; and
a tank configured to store hydraulic fluid supplied to the hydraulic source,
wherein the hydraulic actuator includes
   a cylinder body;
   a piston configured to reciprocate inside the cylinder body; and
   a first chamber and a second chamber separated by the piston,
wherein the hydraulic source includes
   a first suction and discharge port connected to the first chamber via a first passage; and
   a second suction and discharge port connected to the second chamber via a second passage, and
wherein at least a part of hydraulic fluid inside one of the first chamber and the second chamber is drawn in into the hydraulic source while having a fluid pressure higher than a fluid pressure of the hydraulic fluid stored in the tank, and is thereafter discharged from the hydraulic source to be supplied to the other of the first chamber and the second chamber.

4. The injection molding machine as claimed in claim 3, wherein the hydraulic source is configured to supply the second chamber with the hydraulic fluid by drawing in the hydraulic fluid supplied to the first chamber to eject the molding product into the first suction and discharge port through the first passage without depressurization, and discharging the hydraulic fluid from the second suction and discharge port.

5. The injection molding machine as claimed in claim 1, wherein the assist actuator is an electric actuator.

* * * * *